(12) United States Patent
Kim

(10) Patent No.: US 7,539,525 B2
(45) Date of Patent: May 26, 2009

(54) WIRELESS HEADSET PHONE OF EAR-WORN TYPE

(75) Inventor: Young S. Kim, Los Altos, CA (US)

(73) Assignee: Samsung Electronics Co., Ltd (KR)

( * ) Notice: Subject to any disclaimer, the term of this patent is extended or adjusted under 35 U.S.C. 154(b) by 572 days.

(21) Appl. No.: 11/314,308

(22) Filed: Dec. 21, 2005

(65) Prior Publication Data

US 2006/0135223 A1 Jun. 22, 2006

Related U.S. Application Data

(60) Provisional application No. 60/638,810, filed on Dec. 21, 2004.

(30) Foreign Application Priority Data

Nov. 10, 2005 (KR) ...................... 10-2005-0107527

(51) Int. Cl.
*H04M 1/00* (2006.01)
(52) U.S. Cl. .............. 455/575.2; 455/575.1; 455/575.3; 455/575.4; 455/90.3; 379/433.13; 381/150; 381/135
(58) Field of Classification Search .............. 455/575.2, 455/575.1, 575.3, 575.4, 90.3; 379/433.13; 381/150, 135, 361
See application file for complete search history.

(56) References Cited

U.S. PATENT DOCUMENTS

| | | | | |
|---|---|---|---|---|
| 6,252,970 B1 * | 6/2001 | Poon et al. | ................... | 381/374 |
| 6,377,697 B1 * | 4/2002 | Cheng | ......................... | 381/381 |
| 6,856,690 B1 * | 2/2005 | Skulley | ....................... | 381/371 |
| 6,944,307 B2 * | 9/2005 | Berg | ........................... | 381/150 |
| 7,046,799 B2 * | 5/2006 | Ma | ........................ | 379/433.13 |
| 7,120,247 B1 * | 10/2006 | Wade | .......................... | 379/430 |
| 2007/0053543 A1 * | 3/2007 | Lee | .............................. | 381/381 |
| 2008/0152183 A1 * | 6/2008 | Janik et al. | ................... | 381/375 |

FOREIGN PATENT DOCUMENTS

| | | |
|---|---|---|
| CN | 1523928 | 8/2004 |
| EP | 1 372 353 | 12/2003 |

* cited by examiner

*Primary Examiner*—Matthew D Anderson
*Assistant Examiner*—Minh D Dao
(74) *Attorney, Agent, or Firm*—The Farrell Law Firm, PC

(57) ABSTRACT

Disclosed is a wireless headset phone. The wireless headset phone includes: a body housing; at least one hinge support rotatably mounted to the body housing, for attaching the headset phone to the left or right ear of a user; an earpiece provided in the hinge support; and an ear hook connected to the hinge support to support the headset phone, the ear hook being fit around the ear of the user to enable the user to put on the headset phone.

6 Claims, 6 Drawing Sheets

WIRELESS HEADSET PHONE OF EAR-WORN TYPE

PRIORITY

This application claims priority to a provisional application entitled "WIRELESS HEADSET PHONE OF EAR-WORN TYPE" filed with the United States Patent and Trademark Office on Dec. 21, 2004 and assigned Ser. No. 60/638,810 and to an application entitled "EAR WEARABLE TYPE WIRELESS HEADSET PHONE" filed in the Korean Intellectual Property Office on Nov. 10, 2005 and assigned Ser. No. 2005-107527, the contents of which are incorporated herein by reference.

BACKGROUND OF THE INVENTION

1. Field of the Invention

The present invention relates to a portable terminal including a DMB phone, a game phone, a camera phone, an MP3 phone, a cellular phone, a PCS, a PDA (Personal Digital Assistants), an HHP (Hand Held Phone), and the like, and more particularly to a wireless headset phone which is worn on an ear of a user by using a short-range wireless communication device such as Bluetooth, in order to perform functions of a portable terminal or of another communication device.

2. Description of the Related Art

In general, a "portable communication device" refers to an electronic device that a user can carry to perform wireless communication with a desired partner. To facilitate portability, designs of such portable communication devices tend not only to be compact, slim, and light, but are also moving toward providing multimedia availability, having a wider variety of functions. In particular, future portable communication devices are expected to incorporate greater multi-functionality and are expected to be capable of multi-purpose utilization, as well as being more compact, light, and capable of being modified to be suitable for various multimedia or Internet environments. Additionally, portable communication devices are now commonly used throughout the world by people of all ages and walks of life, and are recognized by some people as a nearly indispensable commodity which should be carried all the time.

Further, conventional portable terminals have been developed to communicate data therethrough. In other words, as the demands of consumers increase, portable terminals will provide various services by using wireless communication technologies which can transmit high speed data.

As a short-range communication device, Bluetooth technology has been employed and generalized in a headset. The headset is worn on a predetermined portion of a user, for example, on a head, an ear, etc., in order to talk to a partner on a phone by using short-range communication technologies. A general headset is a wireless portable device which is worn on an ear of a user, and includes a body, an ear hook for hanging the body on the ear, and the like.

Bluetooth wireless communication systems are widely used in electronic devices such as computers and portable terminals, and Bluetooth headsets provide users with hands-free modes.

SUMMARY OF THE INVENTION

However, the conventional wireless headsets, which are worn on an ear, do not stably support its size and weight. In addition, since the conventional wireless headsets be worn only on one of the right and left ears, the headset, which is designed to be worn on the left ear of a user, can be worn only on the left ear.

Accordingly, the present invention has been made to solve at least the above-mentioned problems occurring in the prior art, and an object of the present invention is to provide a wireless headset phone which can be conveniently and stably worn on either the right or the left ear of a user.

It is another object of the present invention to provide a wireless headset phone which is conveniently worn on either the right or the left ear of a user by using three hinge axes.

In order to accomplish these objects, there is provided a wireless headset phone including: a body housing; at least one hinge support rotatably mounted to the body housing, for tightly attaching the headset phone to the left or right ear of a user; an earpiece provided in the hinge support; and an ear hook connected to the hinge support to support the headset phone, the ear hook being fit around the ear of the user to enable the user to put on the headset phone.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, a preferred embodiment of the present invention will be described with reference to the accompanying drawings. In the following description of the present invention, a detailed description of known functions and configurations incorporated herein is omitted to avoid making the subject matter of the present invention unclear.

Figure 1:
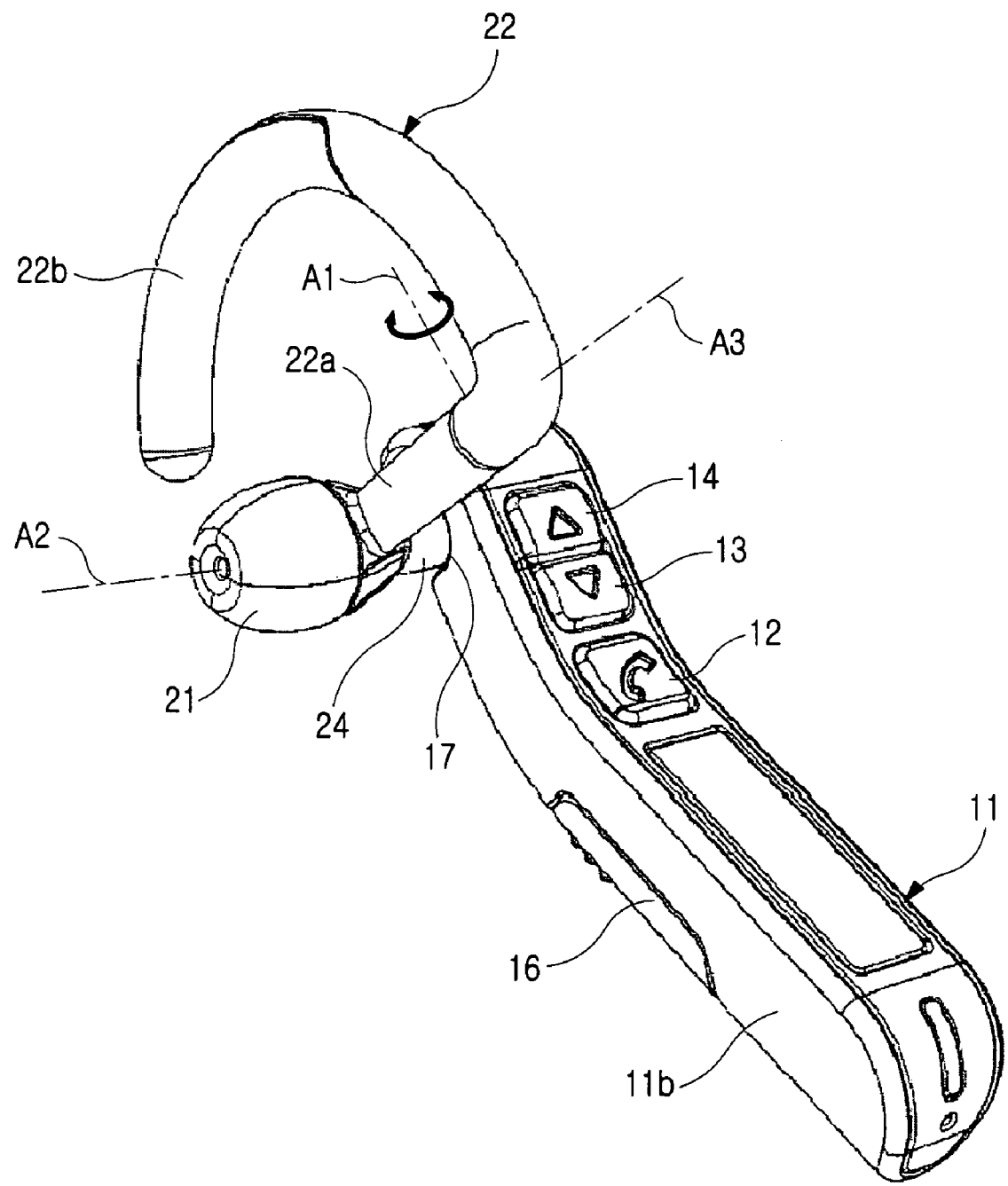
FIG. 1 is a perspective view for showing a headset phone worn on the left ear of a user, according to a preferred embodiment of the present invention.
Figure 2:
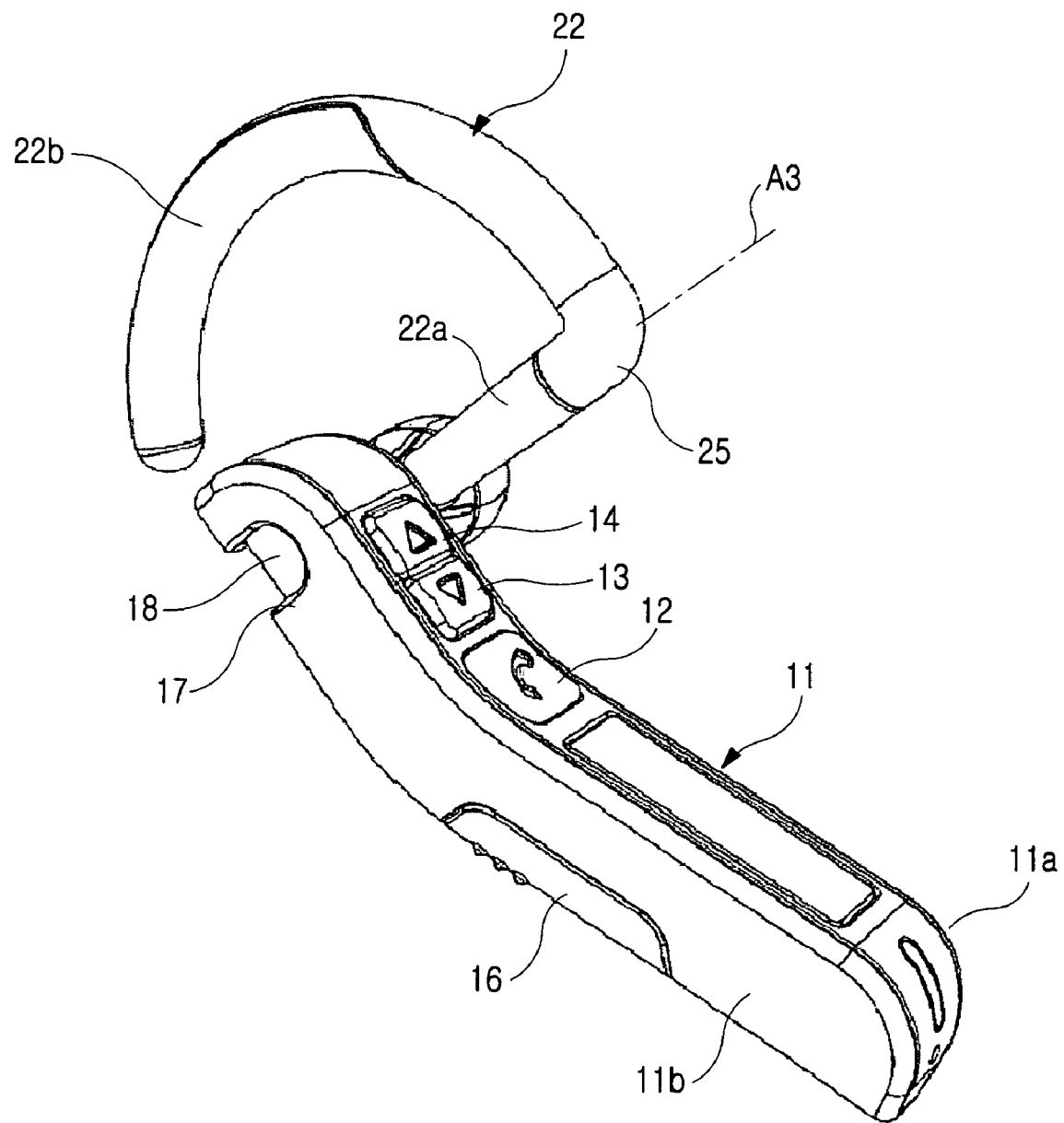
FIG. 2 is a perspective view for showing a headset phone worn on the right ear of a user, according to a preferred embodiment of the present invention.
Figure 3:
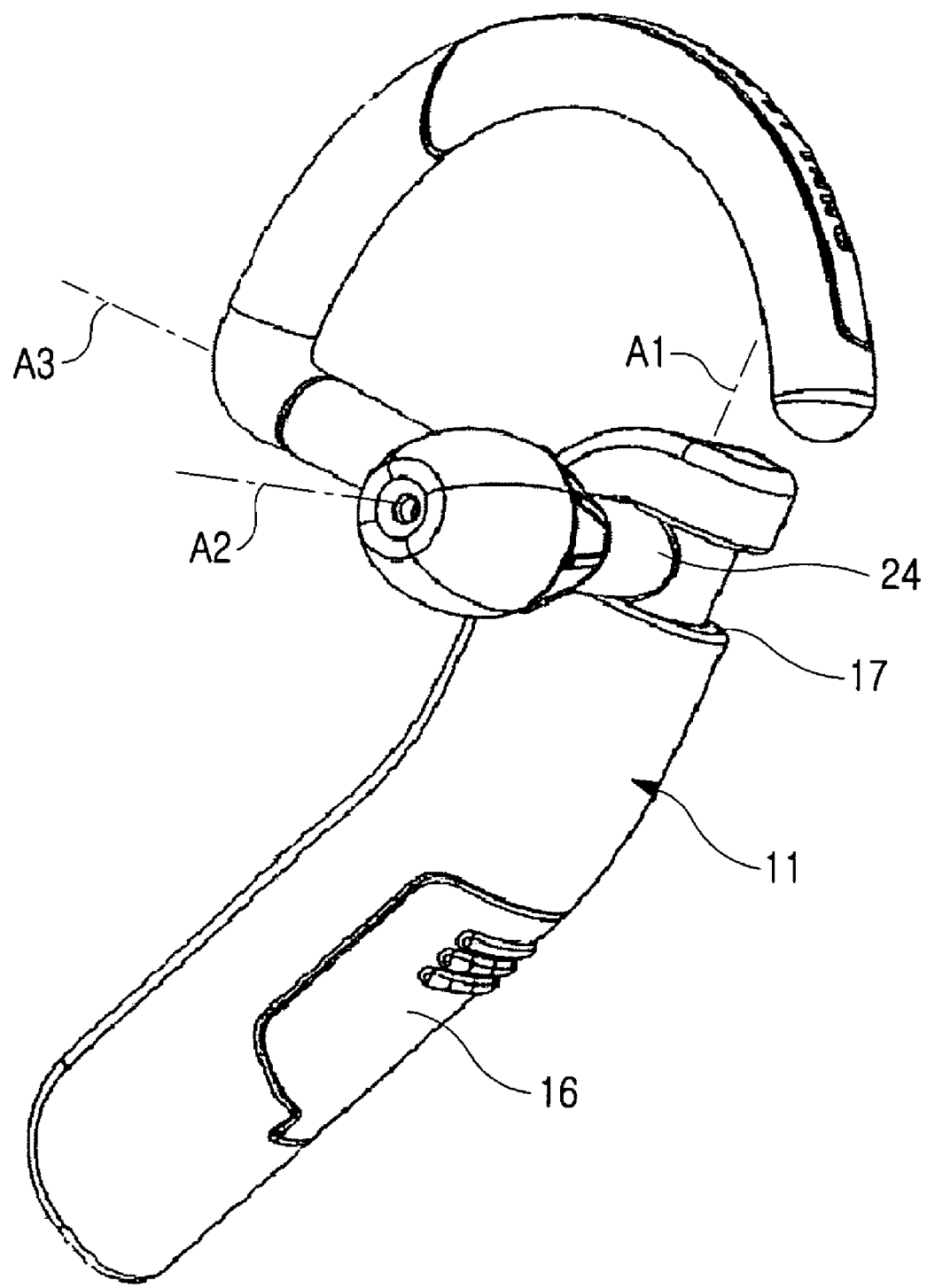
FIG. 3 is a perspective view for showing the bottom portion of the headset phone of FIG. 1.

As shown in FIGS. 1 to 3, a wireless headset phone according to the present invention is a device that operates in an ear-worn state, by using a short-range wireless communication means such as Bluetooth technology. The wireless headset phone according to the present invention can be worn on either the left or the right ear of a user. The wireless headset phone includes a body housing 11, at least one hinge support (comprised of elements 18 and 24), an earpiece 21 including a speaker which is not shown, and an ear hook 22.

The body housing 11 has an elongated shape. The upper portion of the body housing 11 is worn on an ear of a user, and the lower portion thereof is hung off of the ear. The body housing 11 includes an upper housing 11a and a lower housing 11b engaged with the upper housing 11a. The upper housing 11a includes volume regulating switches 13 and 14 which are disposed on the upper surface thereof, adjacent to the earpiece 21, and an ON/OFF switch 12 adjacent to the volume regulating switches 13 and 14, and disposed along the lengthwise direction of the upper housing 11a. The lower housing 11b includes a battery pack 16 in the bottom portion thereof, i.e. on the opposite side of the ON/OFF switch 12. The self weight of the battery pack 16 provides the body housing 11 with extra stability.

The hinge support includes a first hinge member 18 and a second hinge member 24. As the first hinge member 18 is engaged with the body housing 11 so as to be rotated about a first hinge axis A1 following the lengthwise direction of the body housing 11, the earpiece 21 can be disposed on either the left or the right side of the body housing 11. FIG. 1 shows the earpiece 21 disposed on the right side of the body housing 11, and FIG. 2 shows the earpiece 21 disposed on the left side of the body housing 11. The second hinge member 24 is connected to the first hinge member 18 so as to be rotated about a second hinge axis A2 following the direction perpendicular to the first hinge axis A1. The earpiece 21 extends from an end of the second hinge member 24, and is coaxially aligned with the second hinge axis A2. The earpiece 21 includes a speaker which is not shown.

The ear hook 22 includes a linear portion 22a extending in the direction perpendicular to the hinge axis A1, and a curved portion 22b which extends from the outer end of the linear portion 22a to a location adjacent to the earpiece 21 and is worn on an ear of a user in order to supports the body housing 11, which is hung on the ear. The curved portion 22b may be either perpendicular or parallel to the first hinge axis A1, and is connected to the end of the linear portion 22a so as to be rotated about the third hinge axis A3 always perpendicular to the second hinge axis A2. The curved portion 22b is connected to the linear portion 22a by a joint 25. The joint 25 is bent at a right angle.

The lower housing 11b further includes a slot 17 for accommodating the first hinge member 18 and for rotating the second hinge member 24. The first hinge member 18 is completely accommodated in the slot 17, and the second hinge member 24 is rotated within 180 degrees.

If the earpiece 21 of FIG. 1 is rotated by about 180 degrees about the first hinge axis A1, the headset phone is transformed as shown in FIG. 2. The earpiece 21 can be rotated by 180 degrees so as to be worn on the left or right ear of a user.

Hereinafter, the operation of the headset phone according to the present invention will be described with reference to FIGS. 4 to 6.

Figure 4:
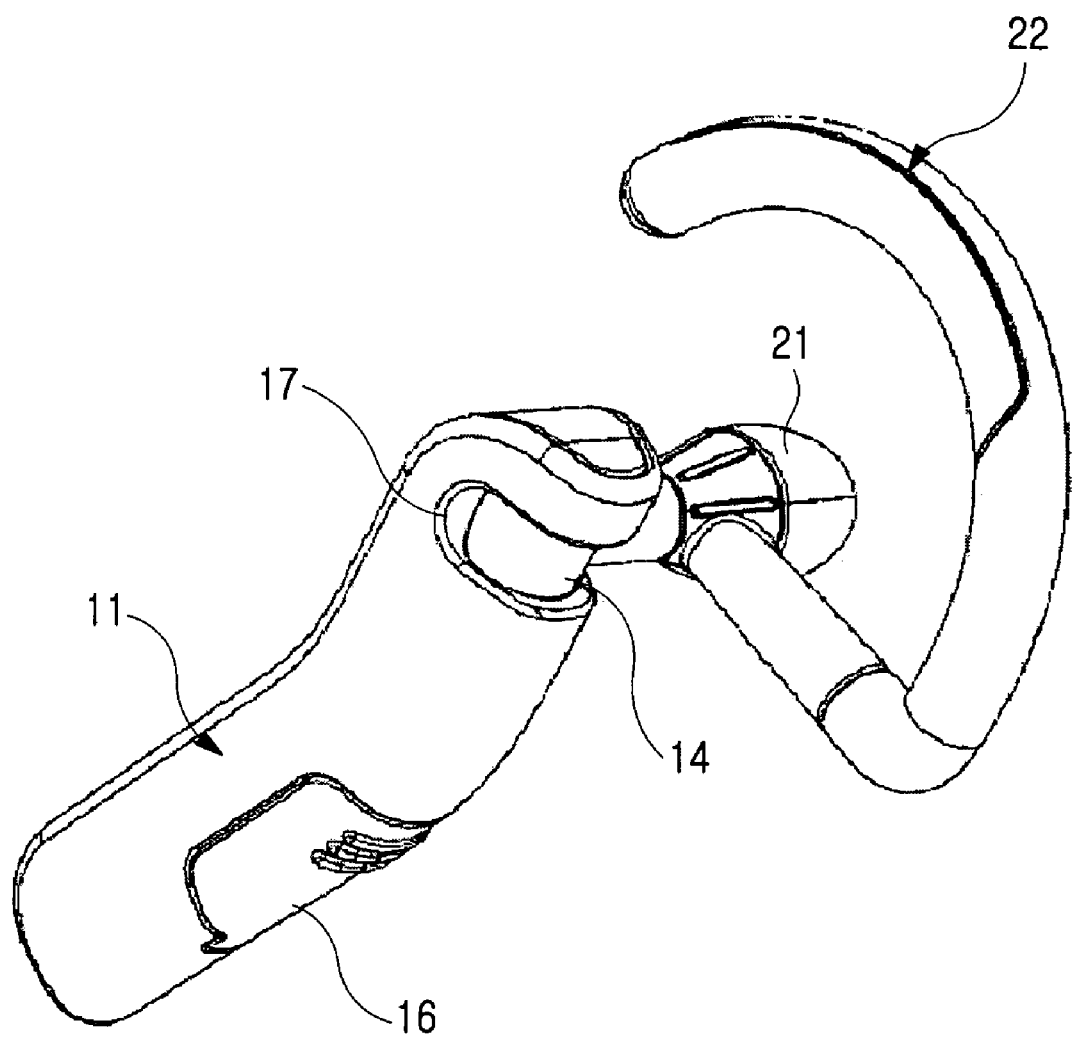
FIGS. 4 to 6 are perspective views for showing states in which a headset phone according to a preferred embodiment of the present invention is transformed to be worn on an ear of a user.
Figure 5:
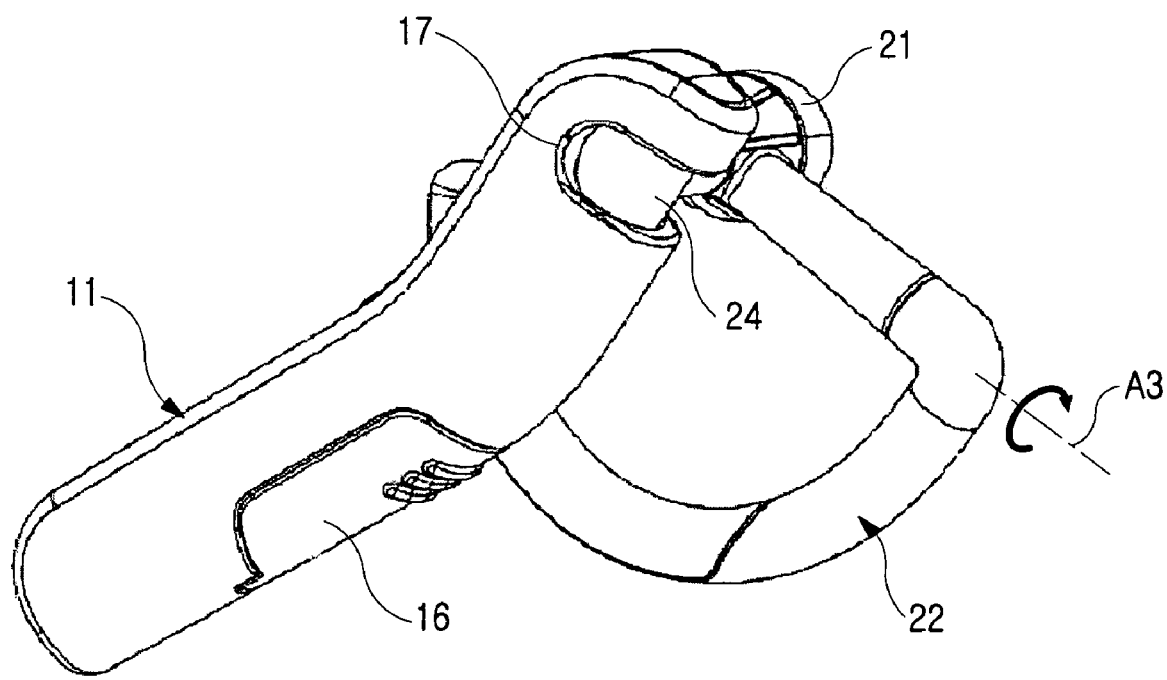
Figure 6:
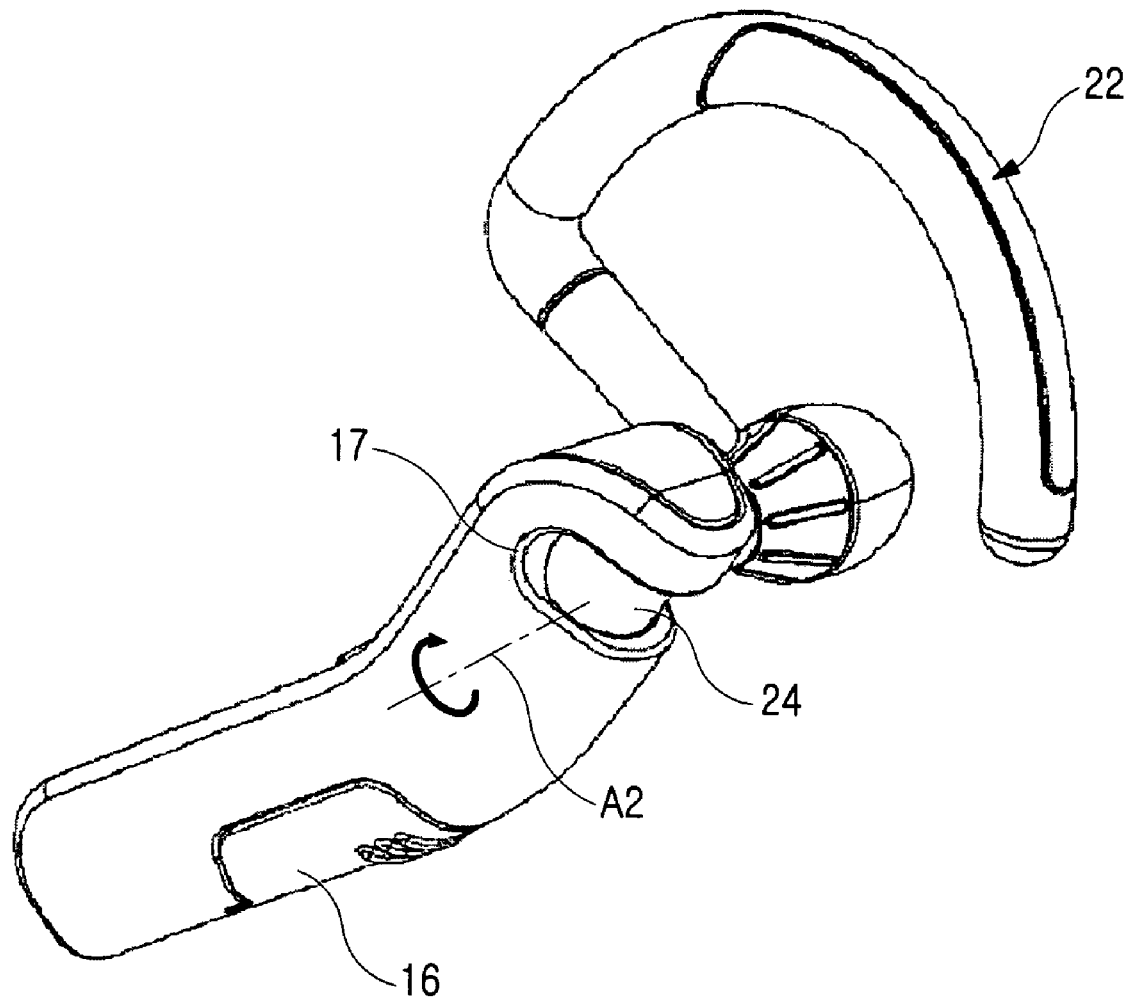

In the state of FIG. 4 in which the earpiece is inserted into an ear of the user, if the curved portion 22b of the ear hook 22 is rotated about the third hinge axis A3, the headset phone is transformed into the state of FIG. 5. In the state of FIG. 5, if the linear portion of the ear hook 22 is rotated about the second hinge axis A2, the headset phone is transformed into the state of FIG. 6 in which it can be worn on an ear of a user. The ear hook 22 is hung on the rear portion of the ear, and the body housing 11 is suspended on the ear. In this state in which the headset phone is worn on the ear, the switches 12, 13, and 14 face the rear side of the ear.

As mentioned above, the headset phone according to the present invention can be conveniently worn on an ear of a user, with the headset phone adhered to the ear. Further, it can be selectively worn on either the left or the right ear of a user.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A wireless headset phone for a user, comprising:
    a body housing;
    at least one hinge support rotatably mounted to the body housing, for attaching the headset phone to the left or right ear of the user based on the rotated position of the hinge support;
    an earpiece provided in the hinge support; and
    an ear hook connected to the hinge support to support the headset phone for attaching the wireless headset phone to the ear of the user,
    wherein the at least one hinge support includes a first hinge member engaged with the body housing so as to be rotated about a first hinge axis following a lengthwise direction of the body housing, and a second hinge member connected to the first hinge member so as to be rotated about a second hinge axis following a direction perpendicular to the first hinge axis, and the earpiece extends from an end of the second hinge member and is coaxially aligned with the second hinge axis.

2. A wireless headset phone according to claim 1, wherein the body housing has an elongated shape so that the upper end portion thereof is worn on the ear and the lower portion is hung from the ear, the body housing including a lower housing and an upper housing assembled to the lower housing.

3. A wireless headset phone according to claim 2, wherein the upper housing includes at least one volume regulating switch adjacent to the hinge support, and an ON/OFF switch disposed along the lengthwise direction of the upper housing, and the lower housing includes a battery pack in the bottom portion thereof and on the opposite side of the body housing from the ON/OFF switch.

4. A wireless headset phone according to claim 2, wherein the lower housing further includes a slot for accommodating the first hinge member and rotating the second hinge member.

5. A wireless headset phone according to claim 1, wherein the ear hook includes a linear portion extending in the direction perpendicular to the second hinge axis, and a curved portion perpendicular or parallel to the first hinge axis, can be rotated about a third hinge axis perpendicular to the second hinge axis, extends from the outer end of the linear portion to a location adjacent to the earpiece, and is worn on the ear of the user.

6. A wireless headset phone according to claim 1, wherein the second hinge member is provided between the first hinge member and the earpiece.

* * * * *